Oct. 21, 1952 C. D. P. SMALLPEICE 2,614,538
MANUALLY ADJUSTABLE PRESSURE REGULATOR
Filed Oct. 2, 1948 3 Sheets-Sheet 1

INVENTOR.
C. D. P. SMALLPEICE
BY
Mawhinney & Mawhinney
Attys.

Oct. 21, 1952 C. D. P. SMALLPEICE 2,614,538
MANUALLY ADJUSTABLE PRESSURE REGULATOR
Filed Oct. 2, 1948 3 Sheets-Sheet 2

INVENTOR.
C. D. P. SMALLPEICE
BY
Mawhinney & Mawhinney
Attys.

Oct. 21, 1952   C. D. P. SMALLPEICE   2,614,538
MANUALLY ADJUSTABLE PRESSURE REGULATOR
Filed Oct. 2, 1948   3 Sheets-Sheet 3

*INVENTOR.*
C. D. P. SMALLPEICE
BY
Attys.

Patented Oct. 21, 1952

2,614,538

UNITED STATES PATENT OFFICE 2,614,538

MANUALLY ADJUSTABLE PRESSURE REGULATOR

Cosby Donald Philipps Smallpeice, Swanwick Shore, near Southampton, England

Application October 2, 1948, Serial No. 52,576
In Great Britain October 3, 1947

5 Claims. (Cl. 121—46.5)

My main object is to provide a simple and reliable manually-operable mechanism of the kind which is power assisted by a fluid-pressure-responsive means to an extent which is substantially directly proportional to the applied manual effort. Such a mechanism may be used for actuating a press or a machine-tool slide, a brake, or for other purposes.

(The term "manual" as used in this specification and in the claiming clauses is intended to include operation either by a person's hand or foot.)

The invention is characterised by a manually-operable control member adapted to act both on the mechanism to be operated and on the diaphragm of a pressure regulator of the diaphragm type, whereby the latter will supply the fluid-pressure-responsive means with fluid at a pressure which is substantially directly proportional to the manual effort applied to the control member.

By the term pressure regulator of the diaphragm type is meant a pressure regulator having an inlet valve which is adapted to be connected to an appropriate source of fluid pressure and which, when open, admits the fluid pressure to a chamber which is bounded on one side by a diaphragm and which is connected to the fluid-pressure-responsive means, the diaphragm acting on the inlet valve to maintain a predetermined pressure in the diaphragm chamber.

Such a pressure regulator is disclosed in the specification of my U. S. Patent No. 2,322,480. In that specification the said predetermined pressure to be maintained in the diaphragm chamber can be varied at will by an adjustment means acting upon the diaphragm. In carrying out the present invention the adjustment means is the said manual control member, or is actuated thereby.

Figure 1:
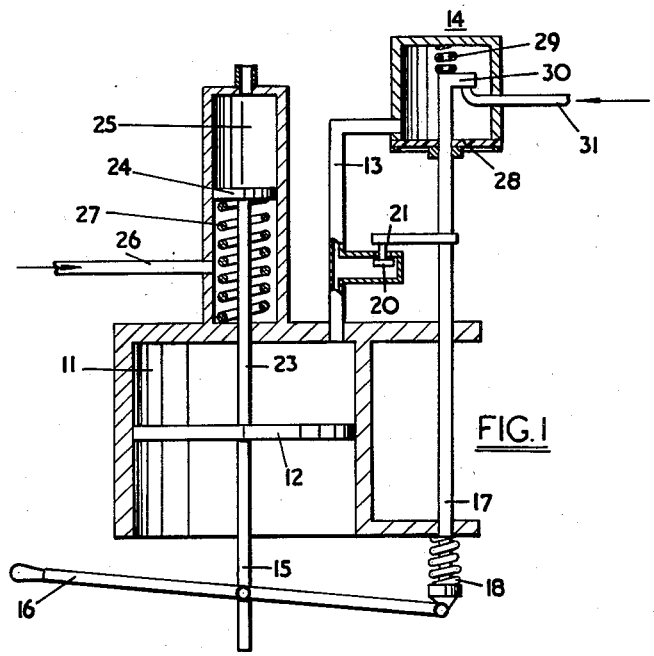
Figure 1 is a diagrammatic sectional elevation illustrating one arrangement according to the invention.

In the construction of Figure 1 there is a stationary cylinder 11 with a plunger 12 which is reciprocable therein, and the motive fluid is air which can be supplied to the upper end of the cylinder by way of a pipe line 13 from a diaphragm type of pressure regulator 14. Extending from the lower end of the cylinder is a piston rod 15 to which is loosely pivoted a manual control member in the form of an actuating handle 16. The fulcrum for the latter is the end of a control rod 17 for the pressure regulator 14, an appropriate spring 18 acting on the control rod. Thus, when it is desired to actuate a press, slide or the like (to be connected directly or indirectly with the piston rod), the operator applies a downward effort to the actuating handle 16, thereby tending to move the slide or the like, and the reaction on the control rod 17 actuates the regulator 14 so as to admit fluid pressure to the cylinder, whereby the slide or the like is actuated by the fluid pressure.

An exhaust valve 20 may be associated with the supply passage 13 leading to the cylinder, the exhaust valve being controlled by an appropriate member 21 mounted on the control rod such that, on the release of the actuating handle 16 and the return of the control rod to its original position, the exhaust valve will be opened, and such that the exhaust valve will immediately be closed on the initial movement of the control rod when the handle is actuated downwardly.

For returning the servo plunger 12 use may be made of a piston rod 23 extending from the other side and carrying a plunger 24, of less diameter than the servo plunger, operating in another cylinder 25 to the appropriate end of which air pressure can be supplied, by the pipe 26, to effect the return of the servo plunger. If desired, the air supplied to the "return" cylinder 25 may be by way of a pressure regulator, arranged and operable as aforesaid.

A spring means 27 may be provided for biasing the servo plunger in the upward direction.

A satisfactory pressure regulator 14 is one having a diaphragm 28 sealing the regulator chamber and with the aid of the spring 29 closing the supply valve 30 (through which compressed air is admitted from the pipe line 31 to the chamber) when the pressure therein has reached a predetermined value, as disclosed in the specification of my U. S. Patent No. 2,322,480 and hereinafter more fully described, dependently upon the force exerted on the diaphragm by the control rod 17. In such case the control rod 17 acts directly upon the diaphragm, thereby setting the regulator to deliver a higher air pressure corresponding to a greater manual effort being exerted upon the actuating handle, and conversely.

Figures 2 to 5 show the application of the control according to the invention to a manually-operable power assisted press including a frame 33 supporting a stationary cylinder 34 having in it a reciprocable piston (not shown) fast with a plunger 35. Below the lower end of the cylinder the plunger carries an arm 36 which is connected by a link 37 to an actuating handle 38. The latter is pivotally mounted at 39 upon a control member 40 pivoted at 41 upon an air pressure regulator 42, as disclosed by Figures 4 and 5. The pivot 39 can be inserted at will in three different sets of holes to vary the leverage to be exerted.

The pressure regulator 42 is, in this instance, a double-acting one receiving compressed air along the pipe line 43 at a pressure of, say, 80 lbs. per square inch and dropping the pressure to a predetermined value dependent upon the setting of the regulator.

When the handle 38 is forced downwardly, moving the plunger 35 downwardly, the reaction on the pivot 39 rocks the control member 40 clockwise (Figure 2), thereby causing fluid pressure to be delivered along the pipe line 44 to the upper end of the cylinder 34, such pressure acting on the piston to assist in forcing the plunger 35 downwardly and being proportional to the manual effort exerted. At the same time the lower end of the cylinder 34 is placed to exhaust by way of the pipe line 45. Conversely, upward movement of the actuating handle 38 rocks the control member 40 anti-clockwise thereby placing the upper end of the cylinder 34 to exhaust by way of the pipe line 44 whilst the lower end receives operating pressure along the pipe line 45.

Figure 2:
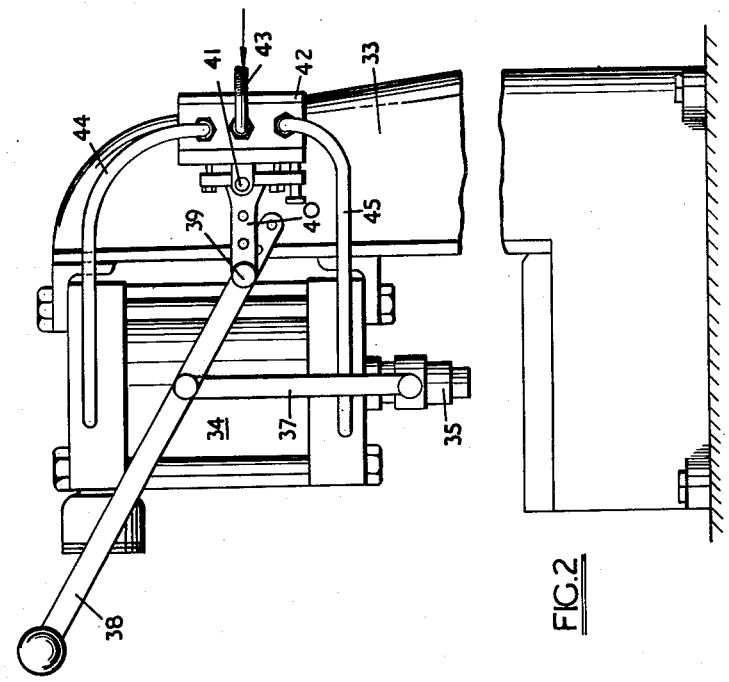
Figure 2 is a side elevation, and Figure 3 a front elevation, of another arrangement according to the invention.
Figure 3:
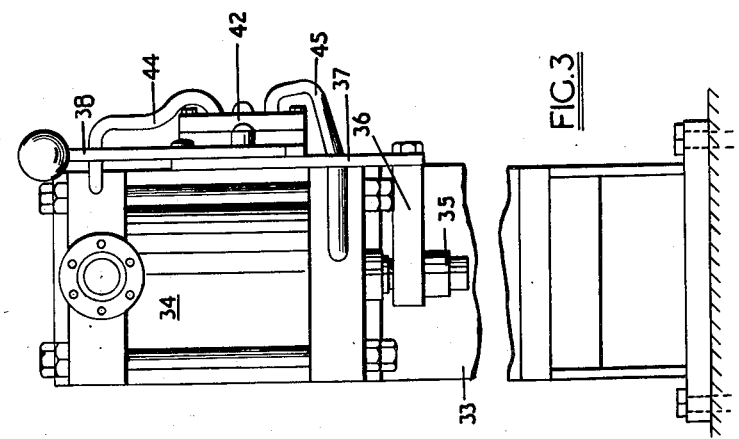
Figure 4:
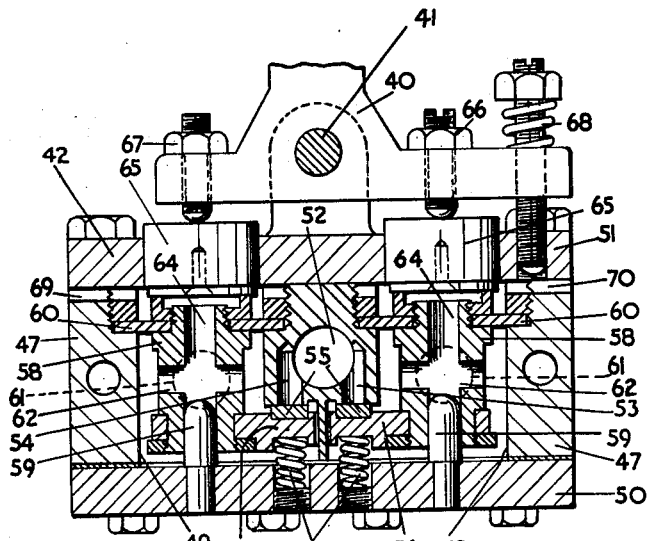
Figure 4 is a cross-section through the regulator, to a larger scale.
Figure 5:
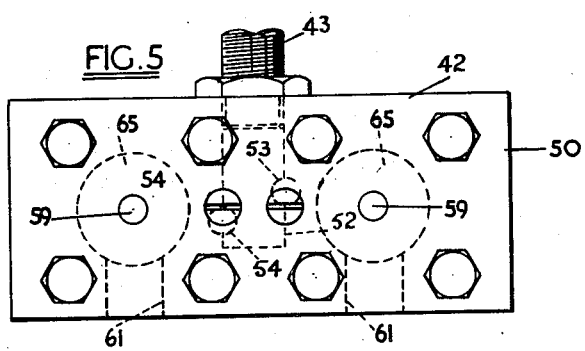
Figure 5 is a view of the regulator taken from the bottom of Figure 4.

With reference now to Figures 4 and 5, these show a body 47 having two similar cylinder bores 48, 49 therein, the upper and lower ends of the body being closed by plates 50, 51. Situated between the two cylinder bores 48, 49 is a transverse bore 52 which communicates with the end of the supply pipe 43 (Figures 2 and 3). Offset from the bore 52 are two passages 53, 54 closed by valves 55, 55 carried by arms 56, 56 pressed in the closing direction by springs 57, 57. Each of the arms is fast with a separate member 58 which is slidably guided at its lower end upon a fixed pin 59, the upper end of each cylinder bore being closed by a diaphragm 60 secured both to the body 47 and to the associated member 58.

The cylinder bores, or diaphragm chambers, each have an outlet 61, one of the outlets 61 being connected to the pipe line 44 and the other to the pipe line 45. Each member 58 has a transverse bore 62 in it communicating with a longitudinal bore 64 the upper end of which coacts with an exhaust valve member 65, the two exhaust valve members respectively coacting with adjustable abutments 66, 67 carried by the arms of the control member 40. An adjustable spring bias is applied to the control member at 68.

When it is desired to pass fluid pressure to the line pipe line 45, the control member 40 is rocked clockwise (Figure 4) causing the adjustable abutment 66 to depress the exhaust valve member 65 on to the adjacent end of the right-hand member 58, thereby opening the associated inlet valve 55. The fluid pressure is then admitted to and builds up in the diaphragm chamber 48 to react upon the associated diaphragm 60, tending to assist the associated spring 57 to close the valve 55 and to move the control member 40 counter-clockwise as necessary, and (assuming, of course, that the applied manual effort is not so great as to charge the diaphragm chamber to the full supply pressure) the inlet valve closes at some predetermined pressure in the diaphragm chamber (less than the full supply pressure) dependently upon the applied manual effort. Thus, the fluid pressure obtaining in the diaphragm chamber 48 and in the pipe line 45 is substantially proportional to the manual effort applied to the handle 38, i. e., by the handle to the control member 40. Furthermore, the clockwise movement (Figure 4) of the control member has disengaged the abutment 67 from the associated exhaust valve 65, and in consequence any excess pressure remaining from a previous operation in the diaphragm chamber 49 can raise the exhaust valve and escape along the passage 69. Naturally as the abutment 67 is clear of the associated exhaust valve 65 (i. e., the left-hand one of Figure 4) the left-hand inlet valve 55 remains closed, thus isolating the diaphragm chamber 49 from the transverse pressure supply bore 52.

In like manner, a lessening of the manual effort applied to the actuating handle, allowing the right-hand inlet valve 55 to close partially (i. e., not fully), will allow surplus pressure in the diaphragm chamber 48, above that for which this operation of the regulator is temporarily set by the actuating handle 40, to raise the associated exhaust valve 65 and escape along the outlet 70, thus reducing the pressure obtaining in the diaphragm chamber 48 to a value commensurate with the then-applied manual effort. Conversely, increasing the manual effort will again seat the exhaust valve and open wider the associated inlet valve so as to raise the pressure in the diaphragm chamber.

In a similar way, when turning the control member 40 anti-clockwise (Figure 4), fluid is supplied to the pipe line 44 whilst the pipe line 45 is placed to exhaust.

The regulator of Figures 4 and 5 is, it should be understood, one which incorporates an exhaust valve the effective area of the movable element of which is related to the effective area of the diaphragm and associated parts, such that the inlet valve 55 remains closed while the associated exhaust valve is open, and the exhaust valve remains closed while the associated inlet valve is open.

In the construction of Figures 4 and 5, if one leaves the actuating handle 40 free, the right-hand regulator is controlled entirely by the setting of the spring 68, to maintain a predetermined pressure in the diaphragm chamber. If the pressure therein falls the inlet valve 55 immediately opens to restore the predetermined pressure. If, for some reason, the pressure therein rises, the exhaust valve 65 immediately lifts to again restore the predetermined pressure. By increasing the pressure of the spring 68 the predetermined pressure for the diaphragm chamber 48 can be set at a higher value, thus biassing the plunger 35 to the raised position.

It will be obvious that, if preferred, the plunger 35 may be spring returned in which case the double-acting regulator 42 can be replaced by a single-acting one.

Figure 6:
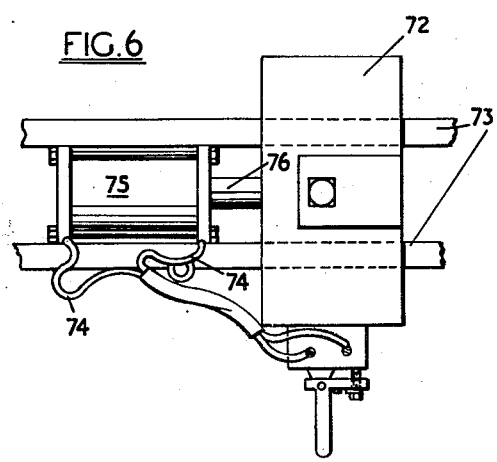
Figure 6 is a plan of another arrangement according to the invention, using the regulator of Figures 4 and 5.

In the arrangement of Figures 2 and 3 the regulator 42 is stationary. In the construction of Figure 6 a similar regulator 42, having a control member 40, is carried by a machine-tool slide 72 adapted to work upon ways 73. The regulator is connected by supply passages 74, 74 to opposite ends of a stationary cylinder 75 having a reciprocable plunger therein connected by a plunger rod 76 to the slide 72. Thus, to move the slide to the right, the operator engages the handle portion of the control member 40 and urges it to the right and, in the manner previously described, this causes the pressure regulator to supply fluid to the left-hand end of the cylinder 75, thereby applying power assistance in moving the slide to the right. The greater the resistance encountered, i. e., the greater the manual effort applied by the operator, the greater is the power assistance given by the fluid pressure servo device.

What I claim as my invention and desire to secure by Letters Patent of the United States is:

1. A pressure regulator including a diaphragm, a chamber bounded on one side by said diaphragm, an inlet valve by which the chamber can be supplied with fluid pressure from an appropriate source of fluid pressure, a slidably-guided member carrying said valve and connected to and passing through an opening in said diaphragm so that said valve will be controlled by the pressure in said chamber, said member having a bore in it communicating with the pressure in said chamber, and a controllable exhaust valve coacting with the bore of said member, such that the inlet valve remains closed while the exhaust valve is open and the exhaust valve remains closed while the inlet valve is open.

2. A pressure regulator including a diaphragm, a chamber bounded on one side by said diaphragm, an inlet valve by which the chamber can be supplied with fluid pressure from an appropriate source of fluid pressure, said valve connected to said diaphragm so as to be controlled by the pressure in said chamber and being arranged to open with the supply pressure, an exhaust valve coacting with an opening through said diaphragm, such that the inlet valve remains closed while the exhaust valve is open and the exhaust valve remains closed while the inlet valve is open, a control member adapted to act on said exhaust valve, and a biassing means acting on said control member.

3. A pressure regulator including a diaphragm, a chamber bounded on one side by said diaphragm, an inlet valve by which the chamber can be supplied with fluid pressure from an appropriate source of fluid pressure, said valve connected to said diaphragm so as to be controlled by the pressure in said chamber and being arranged to open with the supply pressure, an exhaust valve coacting with an opening through said diaphragm, such that the inlet valve is open while the exhaust valve is open and the exhaust valve remains closed while the inlet valve is open, and a pivotally-mounted control member coacting with said exhaust valve and movable in one direction to increase the pressure in said chamber and in the other direction to reduce it.

4. A fluid pressure regulator, in combination with a source of supply, having means providing a chamber which is at all times connected to an outlet passage for supplying a pressure receiving device, the regulator also having an operable exhaust valve by which the chamber can be connected to atmosphere, and an inlet valve, biassed to the closed position and arranged to open with the pressure of the source of supply, by which the chamber can be connected with the source of supply, both the exhaust and inlet valves being subject to the pressure in the chamber, and both said valves being arranged so that the application of a force to the exhaust valve to operate it in the closing direction will first close the exhaust valve and then open the inlet valve, and so that the subsequent release of the applied force on the exhaust valve will first allow the inlet valve to close (if not closed) and then the exhaust valve to open, the regulator being provided with a diaphragm which bounds the said chamber, and with a slidably guided member which supports the inlet valve and is carried by said diaphragm, said guided member having a bore in it receiving the fluid pressure passed by the inlet valve when open, said bore leading to a seating for the exhaust valve.

5. A fluid pressure regulator, in combination with a source of supply, having means providing a chamber which is at all times connected to an outlet passage for supplying a pressure receiving device, the regulator also having an operable exhaust valve by which the chamber can be connected to atmosphere, and an inlet valve, biassed to the closed position and arranged to open with the pressure of the source of supply, by which the chamber can be connected with the source of supply, both the exhaust and inlet valves being subject to the pressure in the chamber, and both said valves being arranged so that the application of a force to the exhaust valve to operate it in the closing direction will first close the exhaust valve and then open the inlet valve, and so that the subsequent release of the applied force on the exhaust valve will first allow the inlet valve to close (if not closed) and then the exhaust valve to open, the exhaust valve being adjustably biassed by a spring to the closed position, thus setting the regulator for a desired pressure in the chamber.

COSBY DONALD PHILIPPS SMALLPEICE.

REFERENCES CITED

The following references are of record in the file of this patent:

UNITED STATES PATENTS

| Number | Name | Date |
| --- | --- | --- |
| 721,499 | Brennan | Feb. 24, 1903 |
| 2,018,197 | Vorech | Oct. 22, 1935 |
| 2,106,017 | Price | Jan. 18, 1938 |
| 2,116,046 | Schmutz | May 3, 1938 |
| 2,137,954 | Sanford | Nov. 22, 1938 |
| 2,282,053 | Hey | May 5, 1942 |
| 2,293,059 | Hirvonen | Aug. 18, 1942 |
| 2,361,130 | Simpson | Oct. 24, 1944 |
| 2,428,457 | Hines | Oct. 7, 1947 |

FOREIGN PATENTS

| Number | Country | Date |
| --- | --- | --- |
| 818,002 | France | June 28, 1937 |